United States Patent
Wang et al.

(10) Patent No.: US 10,222,621 B2
(45) Date of Patent: Mar. 5, 2019

(54) HEAD-MOUNTED DISPLAY APPARATUS

(71) Applicant: NATIONAL CHIAO TUNG UNIVERSITY, Hsinchu (TW)

(72) Inventors: Yu-Jen Wang, Taipei (TW); Po-Ju Chen, Taichung (TW); Hung-Shan Chen, Taichung (TW); Yi-Hsin Lin, Zhubei (TW)

(73) Assignee: National Chiao Tung University, Hsinchu (TW)

( * ) Notice: Subject to any disclaimer, the term of this patent is extended or adjusted under 35 U.S.C. 154(b) by 0 days.

(21) Appl. No.: 15/493,548

(22) Filed: Apr. 21, 2017

(65) Prior Publication Data
US 2017/0307890 A1 Oct. 26, 2017

(30) Foreign Application Priority Data
Apr. 23, 2016 (TW) .............................. 105112739 A (51) Int. Cl.
| | | |
|---|---|---|
| G02B 27/01 | (2006.01) | |
| G02C 7/02 | (2006.01) | |
| G02B 27/28 | (2006.01) | |
| G02B 26/02 | (2006.01) | |
| G02B 26/08 | (2006.01) | |
| G02F 1/29 | (2006.01) | |

(52) U.S. Cl.
CPC ......... *G02B 27/0172* (2013.01); *G02C 7/022* (2013.01); *G02B 26/02* (2013.01); *G02B 26/0875* (2013.01); *G02B 27/283* (2013.01); *G02C 2202/12* (2013.01); *G02F 2001/294* (2013.01)

(58) Field of Classification Search
CPC .................................................. G02B 27/0172
See application file for complete search history.

(56) References Cited

U.S. PATENT DOCUMENTS

| | | | | |
|---|---|---|---|---|
| 6,140,980 A | * | 10/2000 | Spitzer .................. | A61B 3/113 345/8 |
| 7,408,601 B1 | * | 8/2008 | Huang ................. | G02F 1/1334 349/200 |

(Continued)

OTHER PUBLICATIONS

Chen et al. "Electrically adjustable location of a projected image in augmented reality via a liquid-crystal lens" (NPL submitted by applicant, published on Oct. 19, 2015, Optics Express, vol. 23, No. 22, p. 28154, XP055288350, DOI: 10.1364/OE.23.028154).*

(Continued)

*Primary Examiner* — Sang V Nguyen
(74) *Attorney, Agent, or Firm* — Fish & Richardson P.C.

(57) ABSTRACT

A head-mounted display (HMD) apparatus includes an HMD device and a liquid crystal (LC) lens device. The HMD device has a light entering surface for entrance of ambient light, and a light exit surface. The HMD device permits passage of the ambient light therethrough to form a real world image for an observer who wears the HMD apparatus, and generates and projects display light toward the light exit surface to form a computer-generated image for the observer. The LC lens device has an adjustable focal length and is disposed to change convergence of the ambient light and the display light from the HMD device, so as to correct vision of the observer.

10 Claims, 7 Drawing Sheets

(56) References Cited

U.S. PATENT DOCUMENTS

| | | | | |
|---|---|---|---|---|
| 8,666,212 | B1* | 3/2014 | Amirparviz | G02B 27/0172 385/115 |
| 2008/0049152 | A1* | 2/2008 | Hong | G02B 3/14 349/11 |
| 2010/0079865 | A1* | 4/2010 | Saarikko | G02B 6/0016 359/566 |
| 2011/0221656 | A1* | 9/2011 | Haddick | G02B 27/017 345/8 |
| 2011/0227813 | A1 | 9/2011 | Haddick et al. | |
| 2012/0212399 | A1* | 8/2012 | Border | G02B 27/017 345/8 |
| 2012/0235885 | A1* | 9/2012 | Miller | G02B 27/0093 345/8 |
| 2013/0088413 | A1* | 4/2013 | Raffle | G02B 27/0101 345/7 |
| 2013/0222384 | A1* | 8/2013 | Futterer | G02B 5/32 345/426 |
| 2015/0346495 | A1* | 12/2015 | Welch | G02B 27/0172 345/8 |
| 2017/0184848 | A1* | 6/2017 | Vallius | G02B 3/14 |

OTHER PUBLICATIONS

Yi-Hsin Lin and Hung-Shan Chen, "Electrically tunable-focusing and polarizer-free liquid crystal lenses for ophthalmic applications," Optics Express 21(8), 9428-9436 (2013).

Hung-Shan Chen, Yu-Jen Wang, Po-Ju Chen and Yi-Hsin Lin, "Electrically adjustable location of a projected image in augmented reality via a liquid-crystal lens," Optics Express 23(22), 28154-28162 (2015).

* cited by examiner

HEAD-MOUNTED DISPLAY APPARATUS

CROSS-REFERENCE TO RELATED APPLICATION

This application claims priority of Taiwanese Patent Application No. 105112739, filed on Apr. 23, 2016.

FIELD

The disclosure relates to a head-mounted display apparatus, and more particularly to a head-mounted display apparatus with vision correction.

BACKGROUND

A head mounted display (HMD) is a display device which is worn on the head or as part of a helmet, and which has a small display optic in front of one or each eye. Usually, it is necessary for a user that has an eye condition (e.g., myopia, hyperopia, presbyopia, etc.) to wear glasses when using the HMD. However, wearing the glasses and the HMD at the same time may result in discomfort of the user.

SUMMARY

Therefore, an object of the disclosure is to provide an HMD apparatus with vision correction function.

According to one aspect of the disclosure, the HMD apparatus includes an HMD device and a liquid crystal (LC) lens device. The HMD device has a light entering surface for entrance of ambient light, and a light exit surface. The HMD device is configured to permit passage of the ambient light therethrough to form a real world image for an observer who wears the HMD apparatus, and to generate and project display light toward the light exit surface to form a computer-generated image for the observer. The LC lens device has an adjustable first focal length and is disposed to change convergence of the ambient light and the display light from the HMD device, so as to correct vision of the observer.

According to another aspect of the disclosure, the HMD apparatus includes an HMD device and a liquid crystal (LC) lens device. The HMD device has a light entering surface for entrance of ambient light, and a light exit surface. The HMD device is configured to permit passage of the ambient light therethrough to form a real world image for an observer who wears the HMD apparatus, and to generate and project display light toward the light exit surface to form a computer-generated image for the observer. The liquid crystal lens device has an adjustable focal length, and is disposed to change convergence of the display light, so as to change a virtual position of the computer-generated image with respect to the observer.

BRIEF DESCRIPTION OF THE DRAWINGS

Other features and advantages of the disclosure will become apparent in the following detailed description of the embodiment (s) with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 1A:
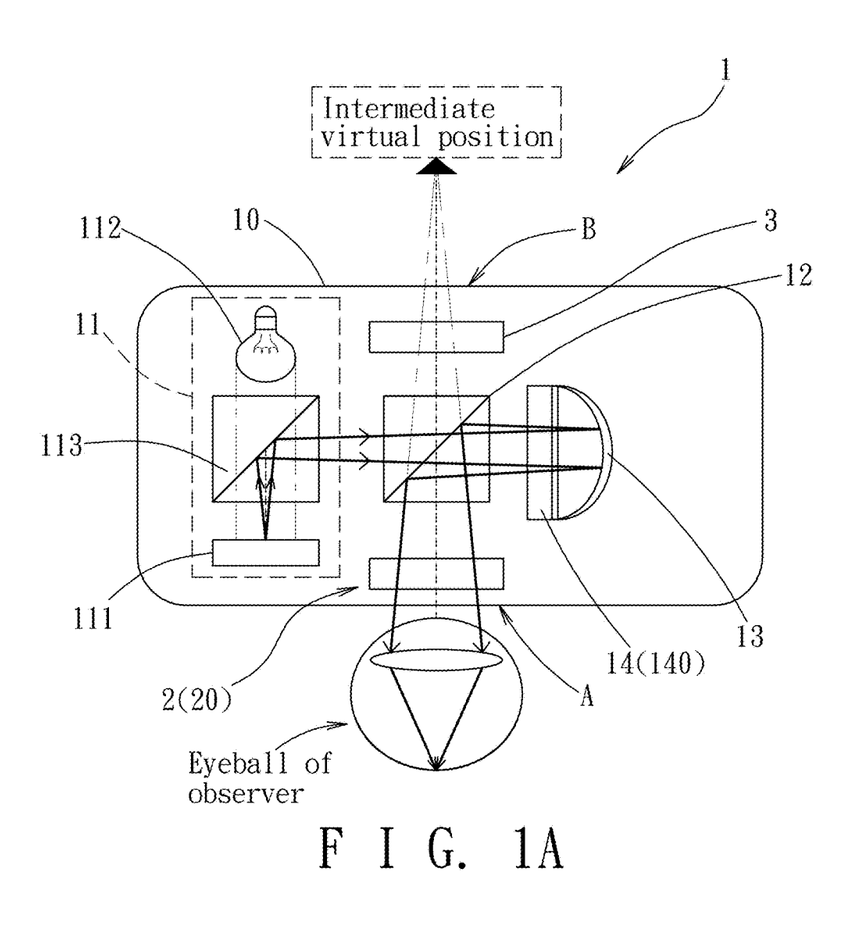
FIGS. 1A and 1B respectively illustrate an embodiment of the HMD apparatus according to the disclosure, and use of the embodiment.

Referring to FIG. 1A, the embodiment of the head-mounted display (HMD) apparatus according to this disclosure is shown to include an HMD device 1, a first liquid crystal (LC) lens device 2 that is disposed proximate to a light exit surface (A) of the HMD apparatus, and a polarizer-free variable attenuator 3 that is disposed proximate to a light entering surface (B) of the HMD apparatus through which ambient light enters the HMD device 1.

The HMD device 1 permits passage of the ambient light therethrough. Accordingly, the ambient light enters from the light entering surface (B), passes through the polarizer-free variable attenuator 3, the HMD device 1, the first LC lens device 2 and the light exit surface (A) in the given order to reach an eye of an observer, thereby forming a real world image (real image) for the observer. The HMD device 1 further generates and projects display light toward the light exit surface (A) to form a computer-generated image (virtual image) for the observer. In this embodiment, the HMD device 1 includes an image generator 11, a beam splitter (BS) 12, a concave mirror 13, a second LC lens device 14, and a housing 10 that has the light exit surface (A) and the light entering surface (B) and that accommodates the components 11-14, the first LC lens device 2 and the polarizer-free variable attenuator 3 therein.

In this embodiment, the image generator 11 is, but not limited to, a liquid crystal on silicon (LCoS) projector that includes a panel module 111 serving as an image source, a light source module 112 providing light for the panel module 111 and a polarizing beam splitter (PBS) 113. The panel module 111 and the light source module 112 cooperate to generate the display light, and the PBS 113 is disposed between the panel module 111 and the light source module 112 to reflect the display light so as to change propagation direction of the display light.

The BS 12 is disposed between the first LC lens device 2 and the polarizer-free variable attenuator 3, and is configured to permit passage of the ambient light, and passage of the display light reflected by the PBS 113. Then, the display light passes through the second LC lens device 14 and reaches the concave mirror 13.

The concave mirror 13 is configured to virtually form the computer-generated image in front of the eye of the observer. The concave mirror 13 reflects, toward the BS 12, the display light passing through the BS 12 and the second LC lens device 14, and the display light reaches the BS 12 again.

The second LC lens device 14 includes an LC lens 140 which has an adjustable focal length and which is disposed between the BS 12 and the concave mirror 13 to change convergence of the display light reflected by the concave mirror 13, so as to change a virtual position of the computer-generated image with respect to the observer in the space. In this embodiment, the focal length of the LC lens 140 is electrically controlled, and the second LC lens device 14 further includes a driver (not shown) for providing an alternating current (AC) signal to control the focal length of the LC lens 140. The PBS 113, the BS 12, the concave mirror 13 and the second LC lens device 14 may be deemed as a projector module with respect to the display light.

Human eyes can only clearly see at once, objects at about the same distance. In other words, when there are two objects at different distances from the observer, the observer's eyes may rapidly change the focal length thereof to respectively obtain clear visions of the two objects in sequence, which may result in dizziness. The second LC lens device 14 and the concave mirror 13 cooperate to form a concave mirror module having an adjustable effective focal length, which is related to the virtual position of the computer-generated image seen by the observer in the space. Accordingly, the virtual position of the computer-generated image may be adjusted to be at the same spatial depth with an object of interest in the real world by changing the focal length of the LC lens 140, so that the observer may clearly see the object of interest and the computer-generated image at the same time.

The BS 12 then reflects, toward the light exit surface (A), the display light reflected by the concave mirror 13 and passing through the LC lens 140.

The first LC lens device 2 includes an LC lens 20 which has an adjustable focal length and which is disposed between the BS 12 and the light exit surface (A) to change convergence of the ambient light and the display light from the HMD device 1, so as to correct vision of the observer. In this embodiment, the focal length of the LC lens 20 is electrically controlled, and the first LC lens device 2 further includes a driver (not shown) for providing an AC signal to control the focal length of the LC lens 20.

It is noted that, in this embodiment, each of the LC lens 140 and the LC lens 20 is free of polarizer to prevent light from attenuation thereby. Each of the first and second LC lens devices 2, 14 may be realized using an electrical controlling LC glasses structure as disclosed in U.S. Pat. No. 8,928,854, but this disclosure is not limited thereto.

The polarizer-free variable attenuator 3 is disposed between the light entering surface (B) and the BS 12 for attenuating intensity of the ambient light that enters the HMD device 1. When the HMD apparatus operates in an augmented reality (AR) mode, the polarizer-free variable attenuator 3 may be adjusted to enhance contrast of the computer-generated image. For example, the ambient light may have high intensity in the daytime, so the polarizer-free variable attenuator 3 may be adjusted to have lower transmittance to reduce brightness of the real world image, and thus the computer-generated image may be viewed more clearly. When the HMD apparatus is switched to operate in a virtual reality (VR) mode, the polarizer-free variable attenuator 3 may be adjusted to completely block the ambient light. It is noted that, use of the polarizer-free variable attenuator 3 may achieve larger adjustable range of ambient light brightness, and the same attenuation level for all types of ambient light among which some may be partially polarized (e.g., light reflected by leaves, ground, sea, etc.).

Figure 1B:
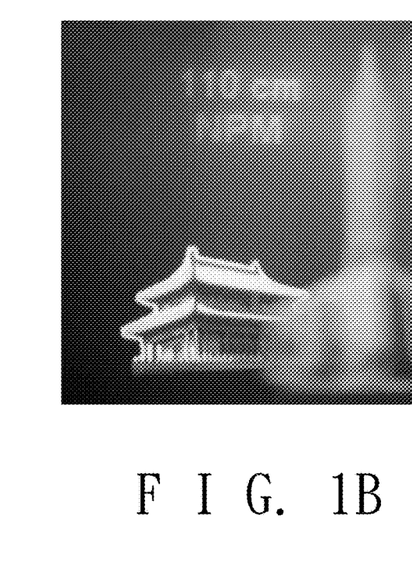
Figure 2:
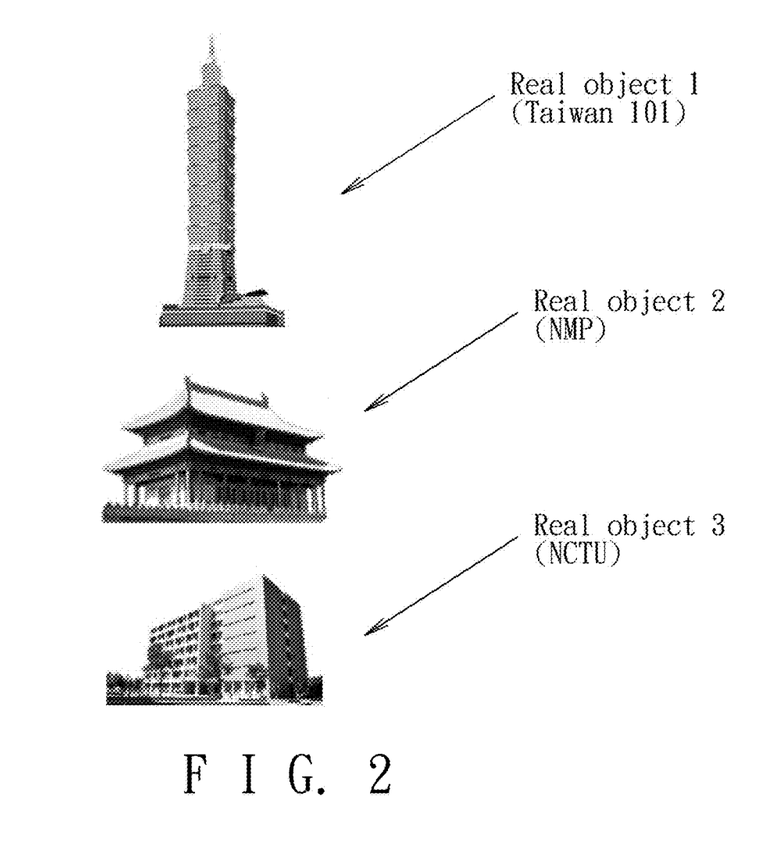
FIG. 2 includes three pictures serving as real objects for exemplifying use of the embodiment.

Referring to FIG. 2, three real objects (RO1, RO2, RO3) are used in FIGS. 1B, 3B, 4B, 5B, 6B, 7A and 7B to exemplify operations and effects of the embodiment. Among the objects (RO1, RO2, RO3), the object (RO1) is farthest from the observer (e.g., at a distance of 360 cm from the observer), the object (RO2) is closer to the observer (e.g., at a distance of 110 cm from the observer), and the object (RO3) is closest to the observer (e.g., at a distance of 50 cm from the observer). FIGS. 1A and 1B illustrate that the object (RO2) is located in a first range in which the observer has a clear vision, and the computer-generated image (e.g., an image of "110 cm NPM") is formed at an intermediate virtual position within the first range.

Figure 3A:
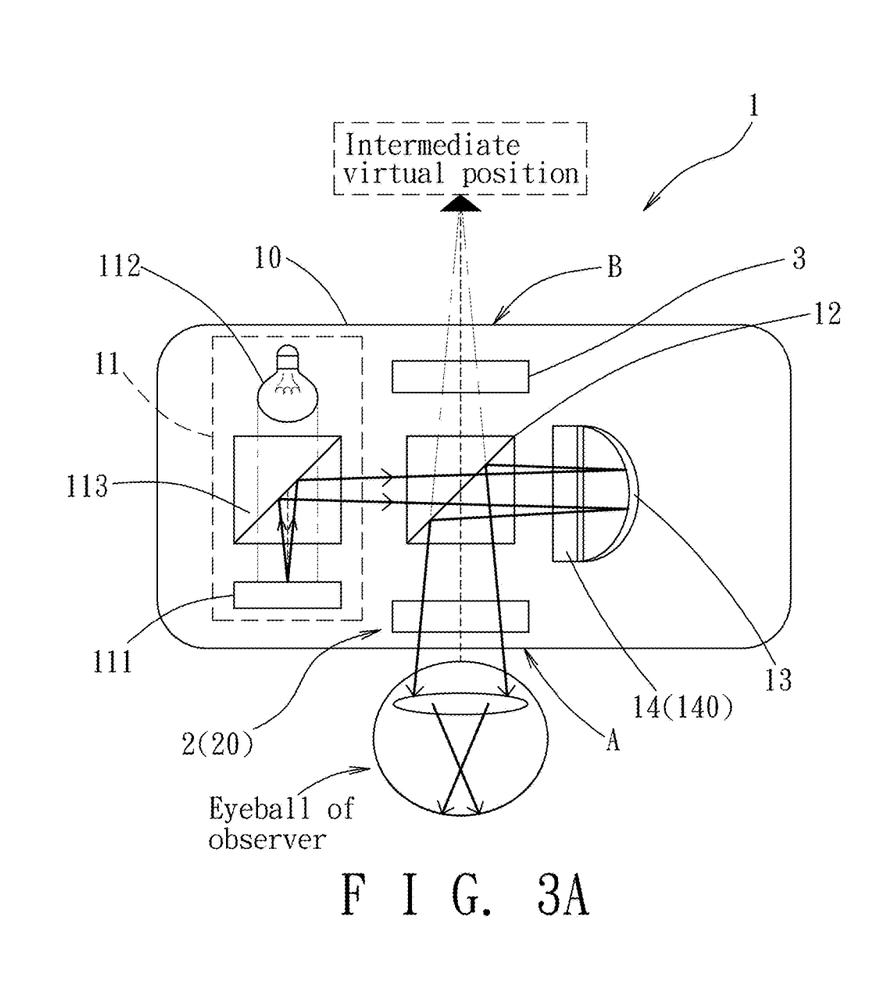
FIGS. 3A, 3B, 4A and 4B illustrate use of the embodiment in a first case.
Figure 3B:
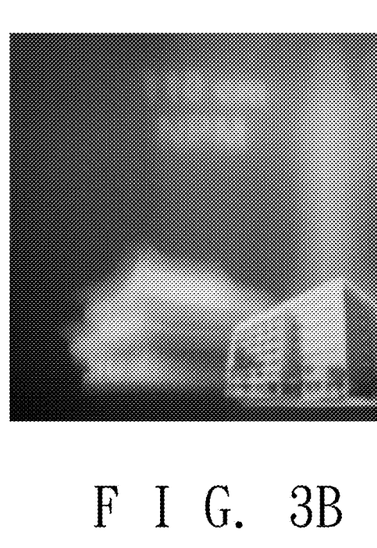
Figure 4A:
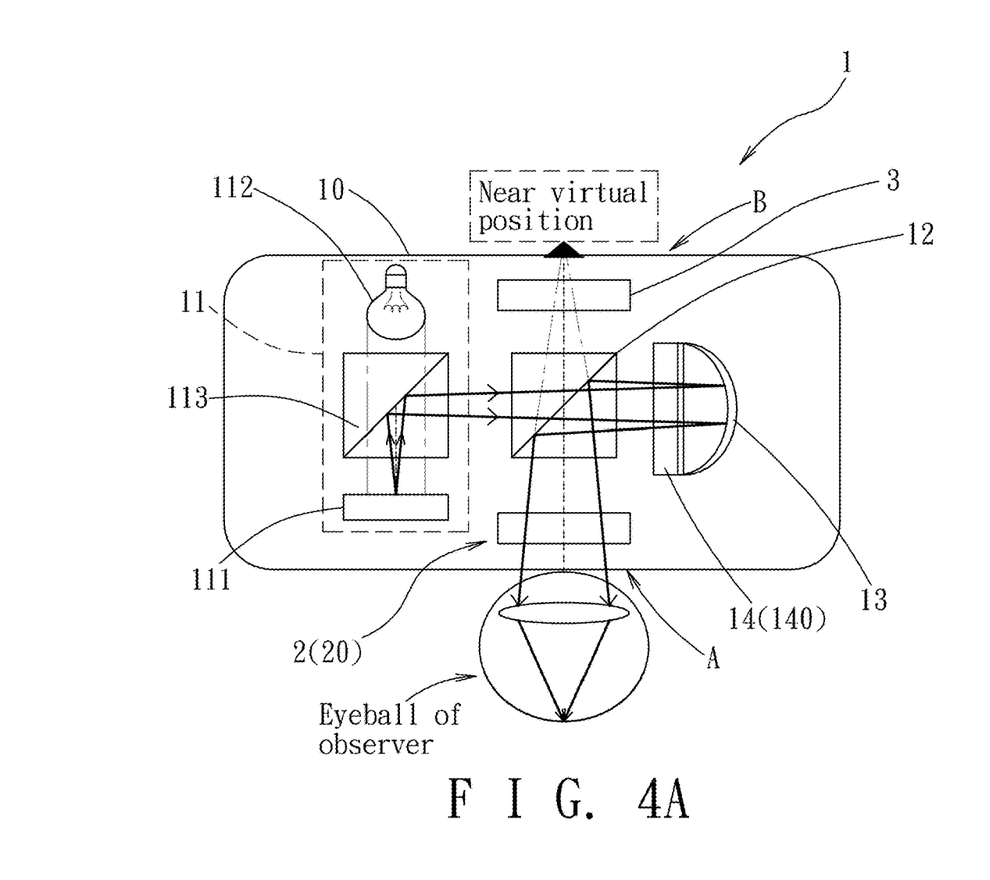
Figure 4B:
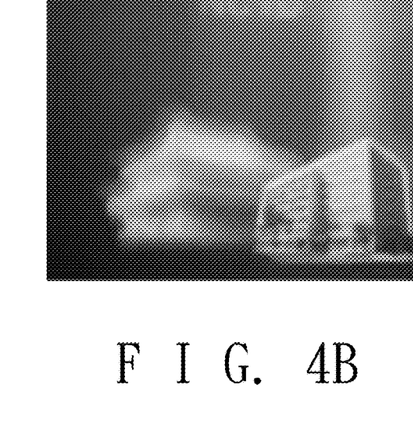

In a first case that the observer is unable to clearly see the closest object (RO3) due to hyperopia or presbyopia, the focal length of the first LC lens device 2 may be adjusted to correct the observer's vision in order to view the object (RO3) more clearly, as shown in FIGS. 3A and 3B, while the computer-generated image (e.g., an image of "110 cm NPM") formed within the first range becomes blurred. Referring to FIGS. 4A and 4B, the focal length of the second LC lens device 14 may then be adjusted such that the computer-generated image (e.g., an image of "50 cm NCTU") is formed at a near virtual position within a second range in which the object (RO3) is located. As a result, the observer can clearly see both of the object (RO3) and the computer-generated image.

Figure 5A:
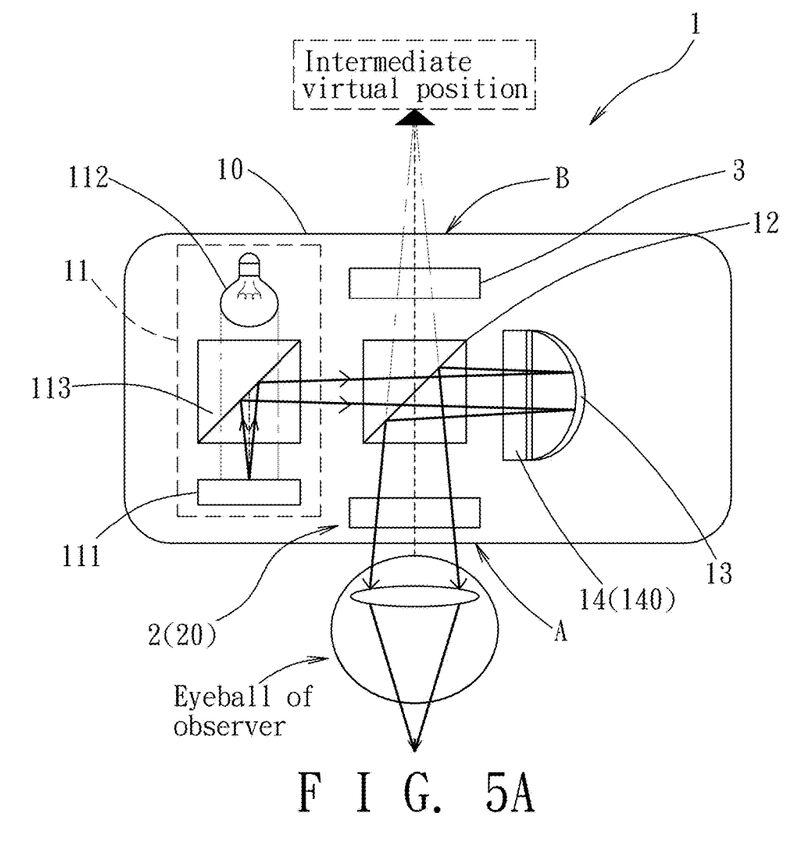
FIGS. 5A, 5B, 6A and 6B illustrate use of the embodiment in a second case.
Figure 5B:
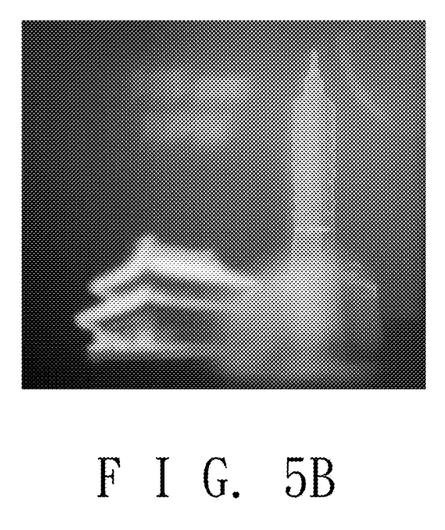
Figure 6A:
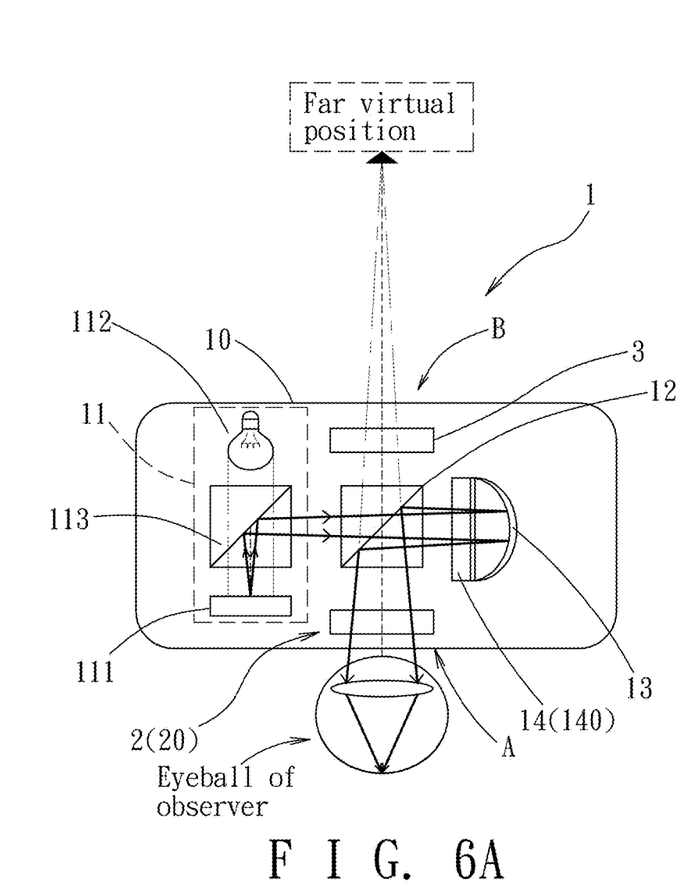
Figure 6B:
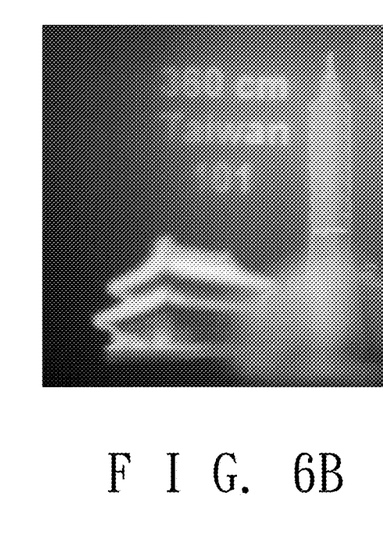

In a second case that the observer is unable to clearly see the farthest object (RO1) due to myopia, the focal length of the first LC lens device 2 may be adjusted to correct the observer's vision in order to view the object (RO1) more clearly, as shown in FIGS. 5A and 5B, while the computer-generated image "110 cm NPM" formed within the first range becomes blurred. Referring to FIGS. 6A and 6B, the focal length of the second LC lens device 14 may be adjusted such that the computer-generated image "360 cm Taiwan 101" is formed at a far virtual position within a third range in which the object (RO1) is located. As a result, the observer can clearly see both of the object (RO1) and the computer-generated image.

Figure 7A:
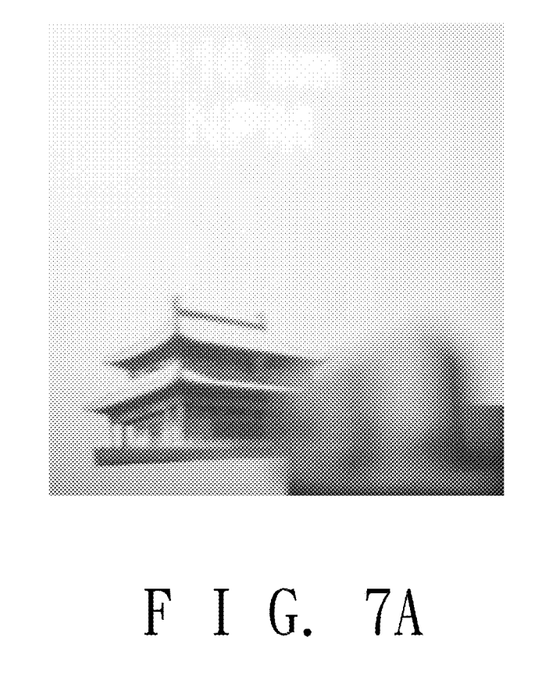
FIGS. 7A and 7B illustrate use of the embodiment in a third case.
Figure 7B:
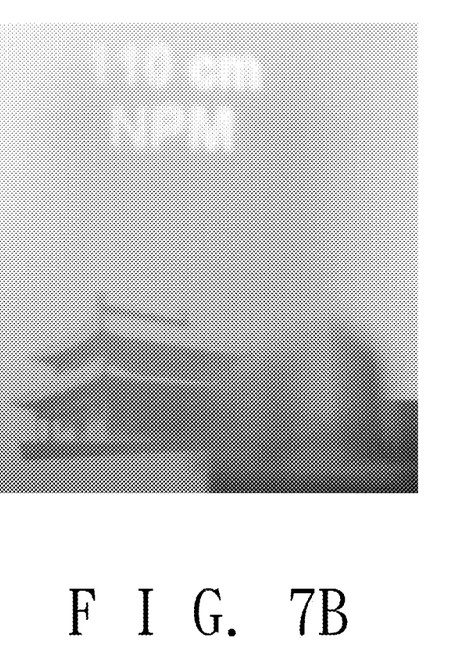

In a third case, when the HMD apparatus operates in the AR mode, and when the computer-generated image (e.g., an image of "110 cm NPM") may not be seen clearly (see FIG. 7A) due to environmental effects such as strong ambient light in the daytime, the polarizer-free variable attenuator 3 may be adjusted to properly reduce intensity of the ambient light, thereby enhancing contrast of the computer-generated image, and the computer-generated image "110 cm NPM" may thus be well identified (see FIG. 7B). In one embodiment, the attenuator is detachable from the housing 10, and is not necessarily variable because several attenuators with different attenuation properties may be prepared for use in different conditions.

In summary, the HMD apparatus of this disclosure uses the first LC lens device 2 for vision correction, so that the users with different vision conditions may normally use the HMD apparatus to clearly see objects in the real world without wearing glasses. The second LC lens device 14 may be used to adjust the virtual position of the computer-generated image in the space, so that the computer-generated image can still be clearly seen after the adjustment of the focal length of the first LC lens device 2. Furthermore, since the focal length of the first LC lens device 2 is adjustable to fit different vision conditions, cost for customization may thus be eliminated.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A head-mounted display apparatus comprising:
    a head-mounted display device that has a light entering surface for entrance of ambient light, and a light exit surface, said head-mounted display device being configured to permit passage of the ambient light therethrough to form a real world image for an observer who wears said head-mounted display apparatus, and to generate and project display light toward said light exit surface to form a computer-generated image for the observer;
    a first liquid crystal lens device which has an adjustable first focal length and which is disposed to change convergence of the ambient light and the display light from said head-mounted display device, so as to correct vision of the observer; and
    a polarizer-free attenuator disposed to attenuate intensity of the ambient light that enters said head-mounted display device.

2. The head-mounted display apparatus of claim 1, wherein said head-mounted display device includes a second liquid crystal lens device which has an adjustable second focal length, and which is disposed to change convergence of the display light, so as to change a virtual position of the computer-generated image with respect to the observer.

3. The head-mounted display apparatus of claim 2, wherein said head-mounted display device further includes:
    an image generator for generating the display light;
    a beam splitter disposed to permit passage of the display light from said image generator; and
    a concave mirror that reflects, toward said beam splitter, the display light passing through said beam splitter;
    wherein said second liquid crystal lens device includes a liquid crystal lens which has the adjustable second focal length and which is disposed between said beam splitter and said concave mirror to change convergence of the display light reflected by said concave mirror, so as to change the virtual position of the computer-generated image with respect to the observer;
    wherein said beam splitter is disposed to further reflect, toward said light exit surface, the display light reflected by said concave mirror and passing through said second liquid crystal lens device.

4. The head-mounted display apparatus of claim 3, wherein said first liquid crystal lens device includes a liquid crystal lens which has the adjustable first focal length and which is disposed between said beam splitter and said light exit surface.

5. The head-mounted display apparatus of claim 4, wherein said polarizer-free attenuator is disposed such that said beam splitter is between said polarizer-free attenuator and said liquid crystal lens of said first liquid crystal lens device for attenuating intensity of the ambient light that enters said head-mounted display device.

6. The head-mounted display apparatus of claim 3, wherein said polarizer-free attenuator is a variable attenuator capable of adjusting a transmittance of the ambient light.

7. The head-mounted display apparatus of claim 1, wherein said head-mounted display device includes:
    a panel module and a light source module that cooperate to generate the display light that forms the computer-generated image; and
    a projector module for projecting the display light toward said light exit surface.

8. The head-mounted display apparatus of claim 7, further comprising a polarizing beam splitter disposed to reflect the display light generated by said panel module and said light source module, so as to change propagation direction of the display light;
    wherein said projector module includes:
    a beam splitter disposed to permit passage of the display light reflected by said polarizing beam splitter; and
    a concave mirror that reflects, toward said beam splitter, the display light passing through said beam splitter; and
    wherein said beam splitter is disposed to further reflect, toward said light exit surface, the display light reflected by said concave mirror.

9. A head-mounted display apparatus comprising:
    a head-mounted display device that has a light entering surface for entrance of ambient light, and a light exit surface, said head-mounted display device being configured to permit passage of the ambient light therethrough to form a real world image for an observer who wears said head-mounted display apparatus, and to generate and project display light toward said light exit surface to form a computer-generated image for the observer; and
    a liquid crystal lens device which has an adjustable focal length, and which is disposed to change convergence of the display light, so as to change a virtual position of the computer-generated image with respect to the observer.

10. The head-mounted display apparatus of claim 9, wherein said head-mounted display device further includes:
    an image generator for generating the display light;
    a beam splitter disposed to permit passage of the display light from said image generator; and
    a concave mirror that reflects, toward said beam splitter, the display light passing through said beam splitter;
    wherein said liquid crystal lens device includes a liquid crystal lens which has the adjustable focal length and which is disposed between said beam splitter and said concave mirror to change convergence of the display light reflected by said concave mirror, so as to change the virtual position of the computer-generated image with respect to the observer;
    wherein said beam splitter is disposed to further reflect, toward said light exit surface, the display light reflected by said concave mirror and passing through said liquid crystal lens device.

* * * * *